United States Patent [19]

Jellinek et al.

[11] Patent Number: 4,650,825

[45] Date of Patent: Mar. 17, 1987

[54] PRODUCTION OF INORGANIC FIBER PRODUCTS

[75] Inventors: Karl Jellinek, Iserlohn-Letmathe; Rolf Müller; Gerhard Wisomirski, both of Duisburg, all of Fed. Rep. of Germany

[73] Assignee: Rutgerswerke Aktiengesellschaft, Fed. Rep. of Germany

[21] Appl. No.: 731,125

[22] Filed: May 6, 1985

[30] Foreign Application Priority Data

Feb. 8, 1985 [DE] Fed. Rep. of Germany ....... 3504339

[51] Int. Cl.$^4$ .............................................. C08L 61/10
[52] U.S. Cl. .................................... 524/596; 524/841; 528/490; 252/62
[58] Field of Search .................. 524/596, 841; 252/62; 528/490

[56] References Cited

U.S. PATENT DOCUMENTS 2,748,101  5/1956  Shappell ............................. 524/596
3,432,453  3/1969  Gladney et al. .................... 524/596

Primary Examiner—John Kight
Assistant Examiner—M. L. Moore
Attorney, Agent, or Firm—Bierman & Muserlian

[57] ABSTRACT

An improved process for the production of glass and mineral fiber products bonded with a phenolic resin in which an aqueous phenol-formaldehyde resin is applied to the inorganic fiber as the bonding agent which is formed with calcium hydroxide as condensation catalyst and the mixture is thermally cured, the improvement comprising prior to processing the aqueous phenol-formaldehyde resin is adjusted to a pH of 7.5 to 11 by addition of a base and sulfate ions are added in an amount of 80 to 200% of the stoichiometric amount required for bonding the calcium ions whereby the calcium ions are converted into a water-soluble complex stable for at least three hours without any precipitation and the products produced thereby.

11 Claims, No Drawings

PRODUCTION OF INORGANIC FIBER PRODUCTS

STATE OF THE ART

Boards and mats of inorganic mineral fibers which are bonded with phenolic resin to increase their capacity for resistance to atmospheric and chemical influences are among the most important sound and heat insulating materials. Diabase, basalt, various slag materials and glass are primarily suited to serve as raw materials which are melted and processed into fibers which are then sprayed with an aqueous phenolic resin solution at the site of their formation, and are subsequently drawn by suction onto a conveyer belt at the bottom of a collecting chamber (bubble chamber). The resulting felt is compressed and moved through the hardening chamber by the conveyer belt whereby the phenolic resin is cured within a few minutes by hot air at 200° to 250° C. which flows through the mat from below.

Aqueous phenolic resin solutions are used as bonding agents for the mineral fibers and prior to the processing, they are admixed with an excess of a concentrated ammonia solution to bond the free formaldehyde contained in the resin solution while forming hexamethylenetetramine, and they are then diluted with water to a dry resin content of 1 to 25%. It has been customary in the last few years to modify the phenolic resins with urea to reduce the bonding agent cost and in addition, urea has the property, as has ammonia, of bonding free formaldehyde. The modification of the aqueous phenolic resin with urea is effected either in conjunction with the production of the resin or shortly prior to the processing.

The quantity of resin applied to the mineral fibers usually amounts to 3 to 8% of dry resin relative to the quantity of mineral fibers. The phenolic resin bonding agents for the mineral wool production are made from phenol and aqueous formaldehyde solutions with addition of a water-soluble, alkaline catalyst for the condensation reaction. The resins are lowly condensed and consist predominantly of mono- and binuclear phenolic alcohols (methylol phenols).

Aqueous solutions of alkali metal hydroxides, especially sodium hydroxide solution, originally served as catalysts for the condensation reaction, but with resins of this kind mineral wools were obtained whose bonding strength deteriorated greatly under the influence of moisture, and which therefore did not meet the requirements in practice over the long run. Neutralization of the alkali portion of these resins after the condensation was completed, e.g., with dilute sulfuric acid, did not bring about any substantial improvement in the moisture resistance of the mineral wool products manufactured from them. This lack of moisture stability was caused by the fact that the phenolic resin contained in its hardened state a water-soluble ash component consisting of, e.g., sodium oxide, sodium carbonate and sodium sulfate.

For this reason, alkaline earth metal hydroxides, especially calcium hydroxide, are used as catalysts for the condensation of phenolic resins since they have the advantage over alkali metal hydroxides in that after completion of the condensation by addition of dilute sulfuric acid, of carbon dioxide, ammonium sulfate or ammonium carbonate they precipitate and can be separated from the aqueous solution in the form of salts insoluble in water (e.g., calcium carbonate, calcium phosphate or calcium sulfate). With this method, resins are obtained which are nearly free of ash. The mineral fiber products produced with them exhibit excellent moisture resistance, particularly if small amounts of aminosilane adhesive (e.g., 0.05% relative to dry resin) are added to the resin.

A serious disadvantage of the described prior art method is the fact, however, that insoluble precipitates accumulate which must be filtered off in an expensive process, since otherwise a clogging of the nozzles occurs during the processing of the resin. Filtration of the resin results in considerable losses of resin and in addition, the disposal of the filter cake containing phenolic resin is expensive and represents a difficult environmental problem.

OBJECTS OF THE INVENTION

It is an object of the invention to provide an improved process for the production of glass and mineral fiber products bonded with a phenolic resin free of interfering precipitate and having good moisture resistance.

It is another object of the invention to provide glass and mineral fiber products with good moisture resistance.

These and other objects and advantages of the invention will become obvious from the following detailed description.

THE INVENTION

The novel process of the invention for the production of glass and mineral fiber products bonded with a phenolic resin in which an aqueous phenol-formaldehyde resin is applied to the inorganic fiber as the bonding agent which is formed with calcium hydroxide as condensation catalyst and the mixture is thermally cured comprises prior to processing the aqueous phenol-formaldehyde resin is adjusted to a pH of 7.5 to 11 by addition of a base and sulfate ions are added in an amount of 80 to 200% of the stoichiometric amount required for bonding the calcium ions whereby the calcium ions are converted into a water-soluble complex stable for at least three hours without any precipitation.

In the process of the invention, a base is added to an aqueous phenolic resin condensed with calcium hydroxide as the catalyst to adjust the pH of the solution to 7.5 to 11, preferably 8 to 10.5 and then sulfate ions are slowly added in an amount of 0.8 to 2.0 times the stoichiometric amount of sulfate ions to react with the calcium ions present. The sulfate ions can be added in the form of sulfuric acid or preferably ammonium sulfate. The pH range can he maintained within the desired pH range by concurrent addition of additional bases.

Surprisingly, no calcium sulfate precipitate is formed and the resin solution remains clear to a large extent and does not change for several hours and up to several days, depending on the composition, and it can therefore be processed during this time-span, if necessary after prior dilution with water and after adding aminosilane as an adhesion-improving agent.

Prevention of the precipitation of calcium sulfate is probably due to the formation of a relatively stable organometallic complex of the calcium ions with the mono- and poly-nuclear phenols or with their methylol compounds, respectively. Ths becomes especially clear when the resin solution is concentrated by evaporation, and the resin hardens in the form of a thin film whereby a clear, transparent, light yellow film is created which exhibits no turbidity whatsoever due to the eliminated calcium sulfate. The inorganic catalyst component consequently has become a component of the bonding agent molecule and correspondingly increases the resin yield.

By modification of the phenolic resin with urea, the moisture resistance of the glass and mineral fiber products produced with it is impaired; but in most cases of application, it still meets the requirements in practice, provided that the quantity of urea does not exceed 100 parts by weight per 100 parts by weight of the phenol employed.

In the method of the invention, ammonia and all basic organic compounds may be used as bases. Examples of these organic bases are: methylamine, ethylamine, propylamine, i-propylamine, butylamine, dimethylamine, trimethylamine, diethylamine, triethylamine, ethanolamine, diethanolamine or triethanolamine. Although the use of alkali metal hydroxides is possible in principle, it is not recommended since the moisture resistance of the fiber products will thereby be reduced. The preferred base is ammonia in the form of a gas or of the aqueous solution.

By adding ammonia to the aqueous resin solution, not only is the residual resin content bonded to form formaldehyde with formation of hexamethylenetetramine, but the water dilutability and the storage stability of the resin system is thereby improved in general. In this respect, it is most advantageous to adjust the resin solution to a pH-range of 8.5 to 10.5.

The aqueous phenol-resin is produced by the reaction of phenol and formaldehyde in a molar ratio of 1:1.3 to 1:4 using 0.5 to 10% of calcium hydroxide, calculated with relation to the quantity of phenol used, at temperatures of up to 100° C. For the transformation of the calcium hydroxide contained in the resin into the water- and resin-soluble organometallic complex, ammonium sulfate is preferred in this method. However, the sulfate ions necessary for the transformation can also be introduced in another manner, for example, by the addition of ammonium bisulfate or dilute sulfuric acid to the resin solution diluted with ammonia. In each case, approximately that quantity of sulfate ions is to be added as is needed stoichiometrically for bonding the calcium ions present in the bonding agent solution. The derivation from the stoichiometric quantity should be not more than 100% upwards or 20% downwards. At greater deviations from the stoichometric quantity, the moisture resistance of the glass and mineral wool products produced with the bonding agent solution may be impaired.

In the following examples there are described several preferred embodiments to illustrate the invention. However, it should be understood that the invention is not intended to be limited to the specific embodiments.

EXAMPLE 1

100 g of phenol were admixed with 212.8 g of a 45% aqueous formalin solution and 5 g of calcium hydroxide and the mixture was held at 60° C. until a specimen cooled down to 20° C. remained clear during dilution with distilled water in a ratio of 1:5, but turned turbid at a ratio of 1:10. Then, the mixture was cooled to a temperature of 10 to 20° C. and then a 25% ammonia solution was added thereto until the resin solution had a pH-value 9.8. 0.035 g of Silane A 1000 and 35.7 g of a 25% aqueous solution of ammonium sulfate were added to the resin solution which was then diluted with water to a dry resin content of 40% (according to DIN 16916-02-H ).

To produce test rods for a quick determination of moisture resistance, 100 parts by weight of quartz sand and 10 parts by weight of the 40% resin solution were well mixed and the mixture was pressed into rod molds measuring 170×22×22 mm and provided with a release agent. The rod molds were then cured in an oven at 180° C. for two hours and the rods were then cooled overnight. The bonding strength of five test rods were determined in the dry state and 5 additional rods were subjected to an alternating boiling test as follows:

4 hours storage of the rods in water at 100° C.,
16 hours storage of the rods in dry air at 60° C. (in the oven),
4 hours storage of the rods in water at 100° C.
2 hours cooling of rods in running water at 15°–20° C.

Then, the bonding strength of the wet rods was determined and the results are summarized in the following Table.

EXAMPLE 2

100 g of phenol were admixed with 212.8 g of a 45% aqueous formalin solution and 5 g of calcium hydroxide and the mixture was held at 60° C. until a specimen cooled down to 20° C. remained clear when diluted with distilled water in a ratio of 1:5, but turned turbid at a ratio of 1:10. After 50 g of urea (in solid form) were added, the mixture was maintained at 40° C. for 1 hour and was then cooled to a temperature of 10° to 20° C. After, a 25% ammonia solution was added until the resin solution showed a pH value of 9.8.

To produce the test rods as above for the rapid moisture resistance test, 0.050 g of silane A 1100 and 36.7 g of 25% aqueous solution of ammonium sulfate are admixed with the said solution, and the solution was diluted with water to a dry resin content of 40%.

COMPARISON EXAMPLE 1

100 g of phenol were mixed with 212.8 g of a 45% aqueous formalin solution and 5 g of calcium hydroxide and the mixture was maintained at 60° C. until a specimen cooled down to 20° C. remained clear during dilution with distilled water in a ratio of 1:5, but turned turbid in a ratio of 1:10. After 50 g of urea (in solid form) were added thereto, the mixture was maintained at 40° C. for 1 hour and then, was cooled to a temperature of 10 to 20° C. Subsequently, the resin solution was mixed first with a 25% ammonia solution to reach a pH-value of 9.8, then with 26.7 g of a 20% aqueous solution of ammonium bicarbonate. The voluminous precipitate of calcium carbonate thereby formed was then filtered off. The resin was diluted with water to a dry resin content of 40%. Before the test rods were produced, 0.050 g of Silane A 1100 (relative to the total quantity of solution) were added to the solution.

COMPARISON EXAMPLE 2

100 g of phenol were admixed with 212.8 g of a 45% aqueous formalin solution and 5 g of calcium hydroxide and the mixture was maintained at 60° C. until a specimen remained clear during dilution with distilled water in a ratio of 1:10, but turned turbid when the ratio is 1:20. After 50 g of urea (in solid form) were added, the mixture was maintained at 40° C. for 1 hour and was then cooled to a temperature of 10° to 20° C. Subsequently, 37% sulfuric acid was added thereto until the resin solution had a pH-value of 7.0 and the voluminous precipitate of calcium sulfate created thereby was then filtered off. The resin solution freed from the precipitate to be used for the production of test rods was adjusted to a pH-value of 9.8 with the aid of a 25% ammonia solution and it was then diluted with water to a dry resin content of 40%. Finally the said solution was mixed with 0.050 g of Silane A 1100 (relative to the total quantity of the solution).

COMPARISON EXAMPLE 3

100 g of phenol were admixed with 212.8 g of a 45% aqueous formalin solution and 5 g of calcium hydroxide and the mixture was maintained at 60° C. until a specimen cooled down to 20° C. remained clear during dilution with distilled water in a ratio of 1:5, but turned turbid when the ratio was 1:10. After 50 g of urea (in solid form) were added thereto, the mixture was maintained at 40° C. for 1 hour and was then cooled to a temperature of 10 to 20° C. Subsequently, a 25% ammonia solution was added until the resin solution had a pH-value of 9.8, and then the resin solution was diluted with water to a dry resin content of 40%. Finally, for the production of test rods, 0.050 g of Silane A 1100 (relative to the total quantity of the solution) were added to the solution.

In this example, both the addition of ammonium sulfate and the precipitation of the catalyst were omitted and therefore, the hardened resin bonding agent contained an ash component which was water-soluble and had an alkaline reaction.

COMPARISON EXAMPLE 4

100 g of phenol were admixed with 212.8 g of a 45% aqueous formalin solution and 6 g of a 50% sodium hydroxide solution, and the mixture was maintained at 60° C. until a specimen coole down to 20° C. remained clear during dilution with distilled water in a ratio of 1:10, but turned turbid when the ratio was 1:20. After cooling down to 40° C., the mixture was neutralized with 65% aqueous p-toluenesulfonic acid to a pH-value of 7.0. Then, 50 g of urea (in solid form) were added, and the mixture was maintained at 40° C. for 1 hour and finally cooled down to 20° C. For the production of test rods, the pH-value of the resin solution was adjusted to 9.8 by addition of a 25% ammonia solution and the solution was then diluted with water to a dry resin content of 50%, 0.050 g of Silane A 1100 (relative to the total quantity of the solution) were added.

The following Table shows the results obtained:

The results of the above table shows that among the resins condensed with calcium hydroxide only those lead to good moisture resistance in which, prior to the processing, the catalyst is either transformed according to the invention (Examples 1 or 2), or is separated as insoluble carbonate or sulfate (comparison Examples 1 and 2). However, if this transformation is omitted (comparison Example 3), or if the resin is condensed with alkali metal hydroxide (comparison Example 4), the moisture resistance drops greatly. Among the examples shown in the table, the examples of the invention are the only ones in which no precipitate is created that must be filtered off, on the one hand, while the cured resin still exhibits good moisture resistance, on the other.

Various modifications of the material and process of the invention may be made without departing from the spirit or scope thereof and it is to be understood that the invention is intended to be limited only as defined in the appended claims.

What we claim is:

1. In a process for the production of glass and mineral fiber products bonded with a phenolic resin in which an aqueous phenol-formaldehyde resin is applied to the inorganic fiber as the bonding agent which is formed with calcium hydroxide as condensation catalyst and the mixture is thermally cured, the improvement comprising prior to processing the aqueous phenol-formaldehyde resin is adjusted to a pH of 7.5 to 11 by addition of a base and sulfate ions are added in an amount of 80 to 200% of the stoichiometric amount required for bonding the calcium ions whereby the calcium ions are converted into a water-soluble complex stable for at least three hours without any precipitation.

2. The process of claim 1 wherein the molar ratio of phenol to formaldehyde of the aqueous phenol-formaldehyde resin is 1:1.3 to 1:4.0.

3. The process of claim 1 wherein 0.5 to 10.0% of calcium hydroxide, relative to the phenol share, are used as condensation catalyst for the water-soluble phenol-formaldehyde resin.

4. The process of claim 1 wherein the aqueous phenolformaldehyde resin condensed with calcium hydroxide is modified by the addition of urea in a quantity of up to 100 parts by weight of urea per 100 parts by weight of the phenol employed.

5. The process of claim 1 wherein a base is added to the bonding agent mixture to adjust the pH-range to 8.5 to 10.5.

TABLE

| Bonding Agent | Catalyst | Urea quantity per 100 g phenol used g | Transformation agent for the catalyst | Filtration | Bending Strength of Test Rods | | |
|---|---|---|---|---|---|---|---|
| | | | | | dry N/mm$^2$ | after alternating boiling test | |
| | | | | | | N/mm$^2$ | % Residual strength |
| Example 1 according to the invention | Ca(OH)$_2$ | 0 | NH$_3$ + NH$_4$)$_2$SO$_4$ | — | 6.1 | 4.2 | 68.8 |
| Example 2 according to the invention | " | 50 | NH$_3$ + (NH$_4$)$_2$SO$_4$ | — | 5.9 | 2.7 | 54.8 |
| Comparison Example 1 | " | 50 | NH$_4$HCO$_3$ | + | 5.6 | 2.1 | 37.5 |
| Comparison Example 2 | " | 50 | H$_2$SO$_4$ | + | 5.2 | 1.9 | 36.5 |
| Comparison Example 3 | " | 50 | — | — | 5.6 | 0.7 | 12.5 |
| Comparison Example 4 | " | 50 | p-toluenesulfonic acid | — | 5.1 | 0.5 | 9.8 |

6. The process of claim 5 wherein ammonia is the base.

7. The process of claim 1 wherein the sulfate ions are introduced into the bonding agent mixture in the form of ammonium sulfate.

8. The process of claim 1 wherein the sulfate ions are added in a quantity of 80 to 120% of the amount stoichiometrically required for bonding the calcium ions present in the bonding agent mixture.

9. The process of claim 1 wherein the stable bonding agent mixture is applied directly or after appropriate further dilution with water onto the fibers by high-pressure pumps through spray nozzles in the bubble or collecting chambers of continuously operating glass and mineral fiber production units, prior to the fibers being collected and compressed into fiber fleece.

10. The process of claim 1 wherein the bonding agent is applied to the glass and mineral fibers in a quantity of 1 to 10% calculated as dry substance.

11. The process of claim 1 wherein the bonding agent is applied to the glass and mineral fibers in a quantity of 3 to 8% calculated as dry substance.

* * * * *